(12) United States Patent
Larew

(10) Patent No.: US 12,138,721 B2
(45) Date of Patent: Nov. 12, 2024

(54) MINING SHIELD BASE LIFT METHODS

(71) Applicant: Swanson Industries, Inc., Morgantown, WV (US)

(72) Inventor: Christopher Scott Larew, Newburg, WV (US)

(*) Notice: Subject to any disclaimer, the term of this patent is extended or adjusted under 35 U.S.C. 154(b) by 0 days.

(21) Appl. No.: 18/241,590

(22) Filed: Sep. 1, 2023

(65) Prior Publication Data

US 2023/0405740 A1  Dec. 21, 2023

Related U.S. Application Data

(62) Division of application No. 17/726,553, filed on Apr. 22, 2022, now Pat. No. 11,772,209.

(51) Int. Cl.
| | |
|---|---|
| *B23P 6/00* | (2006.01) |
| *E21D 23/00* | (2006.01) |
| *E21D 23/18* | (2006.01) |
| *F15B 20/00* | (2006.01) |
| *E21D 23/04* | (2006.01) |

(52) U.S. Cl.
CPC ............ *B23P 6/00* (2013.01); *E21D 23/0078* (2013.01); *E21D 23/18* (2013.01); *F15B 20/00* (2013.01); *E21D 23/0034* (2013.01); *E21D 23/0436* (2013.01)

(58) Field of Classification Search
CPC . E21D 23/0034; E21D 23/0039; E21D 23/04; E21D 23/0436; E21D 23/18; E21D 23/00; B23P 6/00
See application file for complete search history.

(56) References Cited

U.S. PATENT DOCUMENTS 4,516,601 A * 5/1985 Chanal ................... E21D 23/16
137/906

FOREIGN PATENT DOCUMENTS

| GB | 767561 A | * | 2/1957 | |
| WO | WO-2009003892 A1 | * | 1/2009 | .......... F15B 15/1457 |

* cited by examiner

*Primary Examiner* — Sunil Singh
(74) *Attorney, Agent, or Firm* — Richard W. James

(57) ABSTRACT

A longwall mining shield base lift method. The method includes removing an old wear pad and installing a new wear pad.

19 Claims, 5 Drawing Sheets

MINING SHIELD BASE LIFT METHODS

CROSS-REFERENCE TO RELATED APPLICATIONS

The present application is a division of U.S. Utility patent application Ser. No. 17/726,553, filed Apr. 22, 2022, which is pending and incorporated herein in its entirety.

FIELD OF THE INVENTION

This invention is related to mining, and more particularly to an apparatus and method for advancing a longwall mine shield.

BACKGROUND OF THE INVENTION

During longwall mining, a drum or other shear advances along a wall of coal, shearing off a layer of coal for collection. Mine roof supports, such as shield canopy mine roof support systems, contact the mine roof during the shearing operation to prevent roof collapse.

Once shearing has occurred on a section of the longwall, the shield canopy is moved forward toward the coal seam to position it for the next shearing cycle. Furthermore, the mining shield may advance by way of a base lift pressing against a relay bar to lift the shield, while a hydraulic piston moves the shield toward the seam being mined. The base lift is, therefore, a heavy piece of equipment that is performing a heavy, demanding, important function and doing so in a difficult, hazardous, underground environment. Because the base lift operates in such a harsh setting, it must hold-up well and be maintained regularly.

Accordingly, sturdy, robust apparatuses for efficiently advancing shield canopies are needed and those apparatuses should be amenable to fast, easy maintenance to keep the longwall mining process going efficiently and an apparatus that meets those requirements is needed.

U.S. Pat. No. 6,991,407 discloses a Lift Cylinder Assembly for advancing a hydraulic support frame used in underground mining. The lift cylinder includes a piston rod having a support head connected to a drawbar using two plug lock elements. The lock elements engage lock notches in the horizontal drawbar to engage the piston rod or support head. The supporting head is said to include no holes, thereby preventing water or dirt from entering from above and reaching the bearing position between the drawbar and the support head.

United States Patent Application No. US 2012/0180467 discloses an Advancing Assembly and Powered Shield Support for lifting a floor skid relative to an advancing beam. The disclosed assembly includes two-cylinder stages, the first stage including a cylinder head, and a compression spring arranged between the cylinder stages in the words of that patent application. The compression spring disclosed in the US 2012/0180467 patent application is arranged between a base of a cylinder sleeve and an end wall of a cavity. The compression spring is said to be supported at least on one side over its entire length, bearing against the outer wall of a supporting tube and against the inner side of a piston rod wall. The respective radial support of the compression spring over its entire axial length is said to ensure that the compression spring cannot buckle.

Thus, there remains a need for a mining shield base lift to advance the mining shield that is readily amenable to maintenance.

There is a need for a heavy wear pad on a base lift that provides for long use before replacement is required.

There is a need for an easily detachable wear pad on a base lift to speed base lift maintenance.

There is a need for a threaded wear pad on a base lift for speedy removal and replacement and for good retention of the wear pad to the base lift.

There is a need for a wear pad held in place by set screws for fast replacement of the wear pad.

There is a need for the wear pad to have square threads for coupling the wear pad to the base lift to expedite replacement of the wear pad.

There is a need for the set screws to have square threads to further expedite replacement of the wear pad.

There is also a need for a wear pad that includes at least one spanner hole for insertion of a prybar to apply leverage when removing a threaded wear pad.

BRIEF DESCRIPTION OF THE DRAWINGS

The accompanying drawings, wherein like reference numerals are employed to designate like components, are included to provide a further understanding of apparatuses and methods for a base lift, are incorporated in and constitute a part of this specification, and show embodiments of those apparatuses and methods that together with the description serve to explain those apparatuses and methods.

Various other objects, features and advantages of the invention will be readily apparent according to the following description exemplified by the drawings, which are shown by way of example only, wherein.

SUMMARY OF THE INVENTION

In an embodiment, a method of replacing a wear pad on a base lift includes loosening at least one retaining bolt threaded into an old wear pad until that retaining bolt does not impinge upon a cylinder rod, removing the old wear pad from the cylinder rod, placing a new wear pad onto the cylinder rod, and tightening a retaining bolt through the new wear pad until it engages the cylinder rod.

In another embodiment, a method of replacing a wear pad on a base lift, includes unthreading an old wear pad using a bar placed into a spanner hole, removing the old wear pad from the cylinder rod, and threading a new wear pad onto the cylinder rod.

In yet another embodiment, a method of removing an old wear pad from a base lift cylinder and installing a new wear pad on the base lift cylinder includes loosening at least one retaining bolt threaded into an old wear pad until that retaining bolt does not impinge upon a cylinder rod, placing a bar in a spanner hole that extends into the old wear pad, rotating the wear pad using the bar until the old wear pad is loose on the base lift cylinder, removing the old wear pad from the cylinder rod, placing a new wear pad onto the cylinder rod, and tightening a retaining bolt through the new wear pad until it engages the cylinder rod.

Other embodiments, which may include one or more steps of the aforementioned method or other steps, are also contemplated, and may thus have a broader or different scope than the aforementioned apparatus and method. Thus, the embodiments in this Summary of the Invention are mere examples, and are not intended to limit or define the scope of the invention or claims.

DETAILED DESCRIPTION

Reference will now be made to embodiments of longwall mining shield base plate apparatuses and methods, examples of which are shown in the accompanying drawings. Details, features, and advantages of base plate apparatuses and methods will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification do not necessarily all refer to the same embodiment. References to "or" are furthermore intended as inclusive, so "or" may indicate one or another of the ored terms or more than one ored term.

Figure 1:
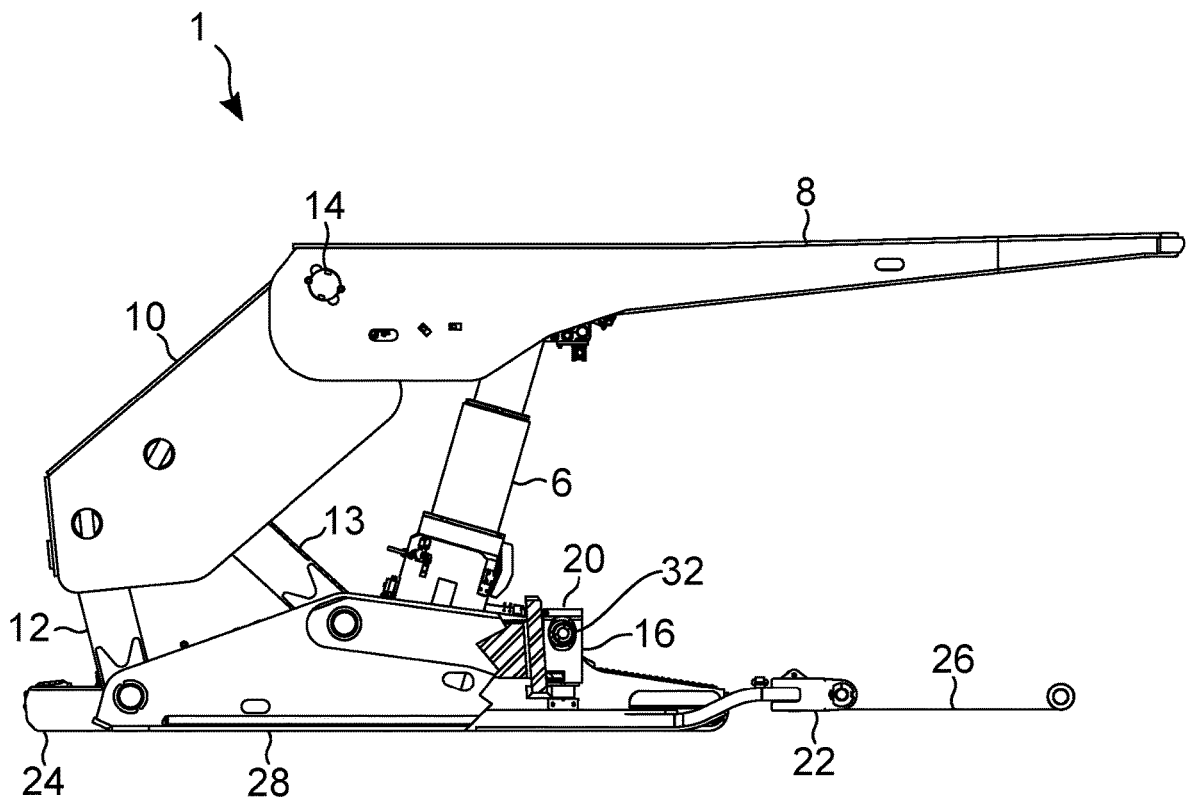
FIG. 1 shows a perspective view of a longwall mining shield in accordance with certain shield embodiments.
Figure 2:
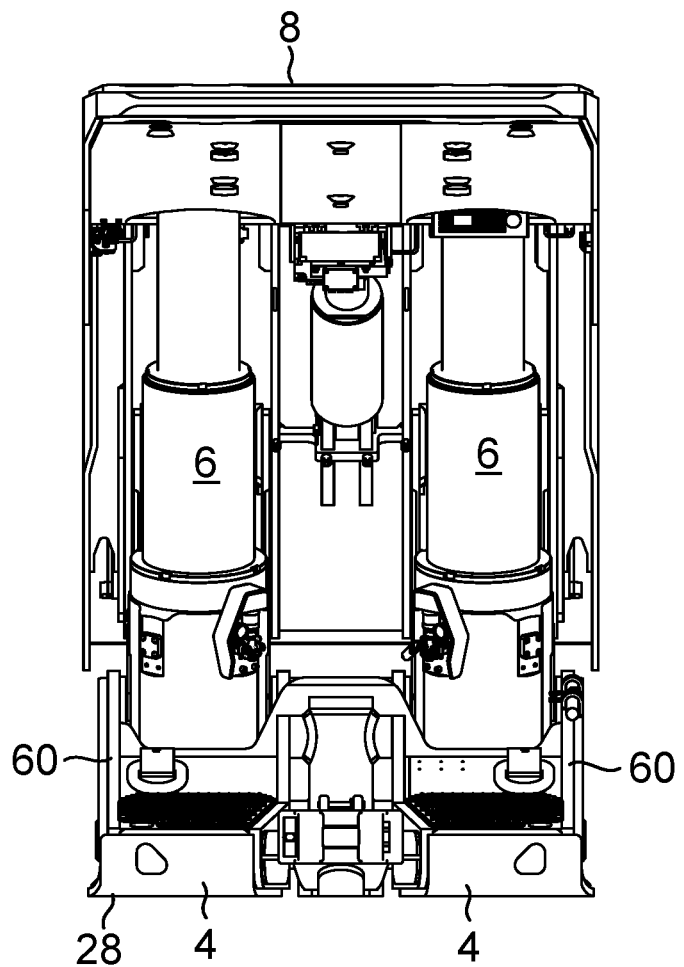
FIG. 2 shows a front view of the longwall mining shield embodiment illustrated in FIG. 1.

FIG. 1 is a side view of an embodiment of a longwall mining shield 1 and FIG. 2 is a front view of the longwall mining shield 1 embodiment illustrated in FIG. 1. That embodiment of the longwall mining shield 1 includes two parallel pontoons 4 that support a pair of leg cylinders 6 that, in turn, support the canopy 8. A caving back 10 is connected to the two pontoons 4 by way of front and rear links 12 and 13 and is connected to the canopy 8 by a pin 14. The height of the canopy may be adjusted by hydraulically operating the leg cylinders 6.

An advancing mechanism 16, which includes at least one base lift 20, a relay bar 22 and at least one ram cylinder 24 is also attached to the pontoons 4 to move the shield 1 toward the longwall face. The shield 1 is attached to a panline 26 through the relay bar 22 and the panline 26 includes a conveyor and a chain that move the sheared coal away from the longwall face. After a depth of coal has been harvested from the longwall, the ram cylinder 24 extends the relay bar 22 out, pushing the panline 26 toward the new longwall face when the shield 1 is set against the mine roof. To advance the shield 1, the shield 1 canopy 8 is lowered and at least one base lift 20 is hydraulically activated, extending the base lift 20 to press against the relay bar 22 between the pontoons 4, thereby lifting the front of a shield 1 base 28. Once the front of the shield 1 base 28 is lifted, the at least one ram cylinder 24 is retracted pulling the shield 1 toward the longwall face. Once the shield 1 has been moved toward the longwall face, the base lift 20 is deactivated, thereby reducing the length of the base lift 20 and allowing the pontoons 4 to rest on the surface below them. The base lift 20 may then gravitationally swing toward a vertical position, rotating on one or more shafts 32 pivotally connecting the base lift 20 to the shield base 28 so the base lift 20 is positioned for activation for the next advance of the shield 1.

Figure 3:
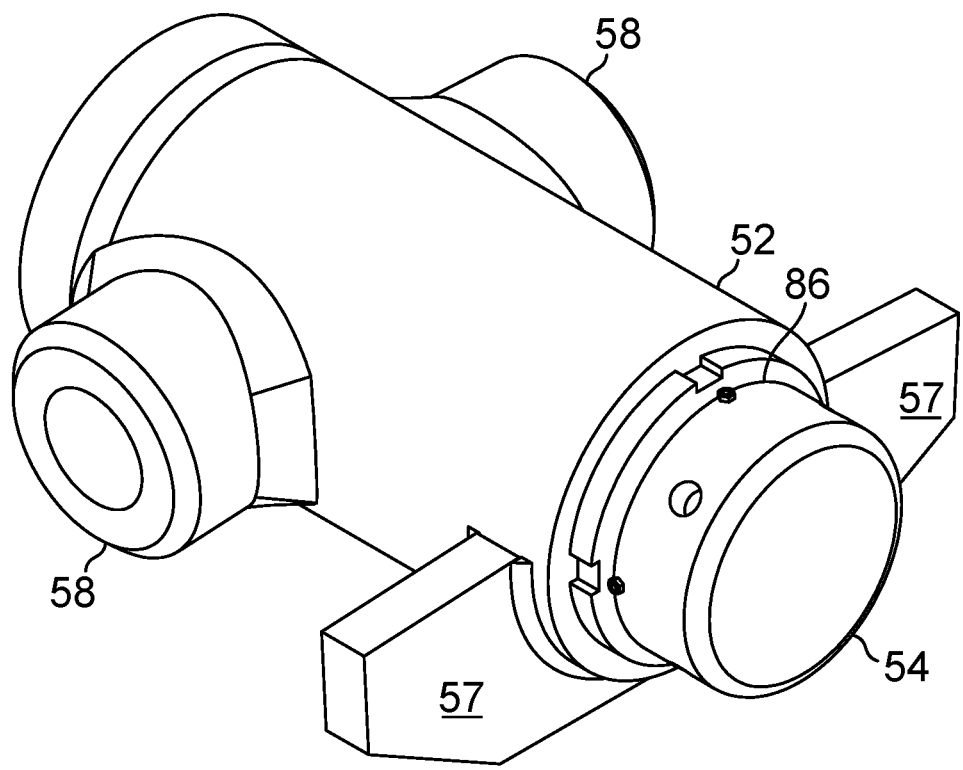
FIG. 3 shows a perspective view of an embodiment of a base lift.

FIG. 3 illustrates a perspective view of a base lift 20 of the present invention. As may be seen in FIG. 3, the base lift 20 includes a hydraulically actuated cylinder rod 50 disposed within a hydraulic cylinder tube 52. A solid wear pad 54 extends between the pontoons 4 and, in operation, contacts dirt, stone, or another material lying beneath the shield 1. A flange 57 and trunnions 58 may be disposed on the cylinder tube 52. One or two shafts, axles, or bolts that may act as axles may be placed through shield base 28 axle connecting holes 60 and connected to or through the trunnions 58 disposed on each side of the cylinder tube 52 to permit rotational motion of the cylinder tube 52 around a line running axially through the axle connecting holes 60.

A gland 86 may be placed at the exposed junction of the wear pad 54 and the cylinder rod 50 to minimize water and dirt migration between the wear pad 54 and the cylinder rod 50. The gland 86 may be compressed between the wear pad 54 and the cylinder rod 50 or placed over the exposed junction of the wear pad 54 and the cylinder rod 50 to minimize infiltration of extraneous water and dirt.

Figure 4:
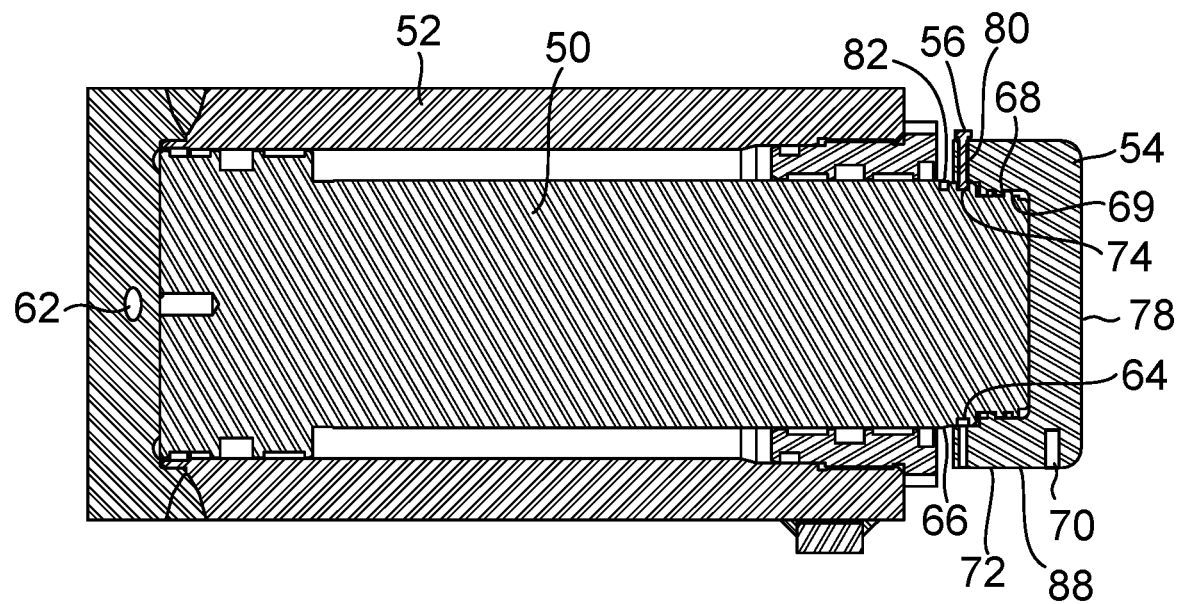
FIG. 4 shows a cross-sectional view of an embodiment of the base lift taken from the side of the base lift.

FIG. 4 illustrates a cross-sectional view of an embodiment of the base lift 20 taken from the side of the base lift 20. The hydraulically actuated cylinder rod 50 may be seen to be disposed within the hydraulic cylinder tube 52. A hydraulic fluid port 62 is disposed in the hydraulic cylinder tube 52 for actuation of the base lift 20. A threaded 68 wear pad 54 is threaded onto the cylinder rod 50 and held in place by retaining bolts 56 that may operate like set screws to hold the wear pad 54 in a desired position. The retaining bolts 56 extend though threaded holes 80 in the wear pad 54 until they press firmly against the cylinder rod 50, thereby retaining the wear pad 54 in place on the cylinder rod 50. The wear pad 54 may alternatively be engaged with the cylinder rod 50 using one of either threading or retaining bolts 56.

The wear pad 54 is intended to be worn during operation of the base lift 20 and to protect the cylinder rod 50 in certain embodiments. Therefore, the wear pad 54 may be constructed of softer steel or other metal than the cylinder rod 50 to promote wear of the wear pad 54 and reduce wear to the cylinder rod 50. The wear pad 54 may furthermore be formed of metal that is not brittle, but rather metal that is susceptible to wear. The wear pad 54 may furthermore be susceptible to slight deformation in operation, but should be constructed of metal that retains its form generally so that the wear pad 54 can best protect the cylinder rod 50 and be removed with ease when it is worn.

The wear pad 54 and cylinder rod 50 may be connected using a variety of threads, including square toothed threads 68, which have been found to be a less difficult style to unthread or "break loose" than standard angled threads after being exposed to the heavy wear that can exist in a subterranean mine where significant dirt and rock may be encountered. Standard angled threads are more likely than square toothed threads to become locked together through moisture, dirt, and rock after heavy use in a harsh mining atmosphere.

When the wear pad 54 has worn from use or is otherwise is to be replaced, the retaining bolts 56 may be loosened or removed and the wear pad 54 may be removed from the cylinder rod 50. In embodiments wherein both retaining bolts 56 and a threaded wear pad 54 is threaded onto the cylinder rod 50, the retaining bolts 56 may be removed or loosened until they no longer impinge upon the cylinder rod 50 first and then the wear pad 54 may be unscrewed and removed from the cylinder rod 50. In embodiments in which only retaining bolts 56 are used, the retaining bolts 56 may be loosened or removed so that the wear pad 54 may be removed from the cylinder rod 50. In embodiments in which a threaded wear pad 54 is used without retaining bolts 56, the wear pad 54 may be unthreaded from the cylinder rod 50 to be removed. A replacement wear pad 54 may then be placed on the cylinder rod 50 by sliding or threading it onto the cylinder rod 50 and, where appropriate, the one or more retaining bolts 56 may be installed through the new wear pad 54 and engage the cylinder rod 50 to retain the wear pad 54 in place on the cylinder rod 50.

In one embodiment, a thick wear pad 54 is threaded onto the end of the cylinder rod 50 using robust square threads 68 on the wear pad 54 and complimentary square threads 69 on the cylinder rod 50. The cylinder rod 50 includes an axial groove 64 extending around its outer surface 66 adjacent the threads 69. The wear pad 54 is positively retained on the cylinder rod 50 by one or more hex head retaining bolts 56 that thread through one or more threaded holes 80 in the wear pad 54 and into firm contact with the cylinder rod 50 in the cylinder rod 50 axial groove 64.

One or more spanner holes 70 may be provided in the wear pad 54 and, in this embodiment, a plurality of spanner holes 70 are provided around an axial edge 72 of the wear pad 54 so that at least one spanner hole 70 will be accessible with the wear pad 54 in most any position. A bar, such as a pry bar, may be inserted into the one of the spanner holes 70 of the wear pad 54 to apply a torque to rotate the wear pad 54, so as to remove a used wear pad 54 or tighten a newly installed replacement wear pad 54. Inclusion of spanner holes 70 reduces the risk that the entire base lift 20 will have to be removed and replaced when a wear pad 54 wears because, by using the spanner holes 70, most wear pads 54 can be removed and replace with the base lift 20 in its operable position.

In the embodiment illustrated in FIG. 4, a worn wear pad 54 can be easily replaced underground in a mine by loosening the retaining bolts 56 and unthreading the wear pad 54 from the cylinder rod 50. Wear pad 54 removal may be expedited using a bar inserted into a spanner hole 70 to rotate the wear pad 54 if the wear pad 54 does not unthread by hand. A new replacement wear pad 54 may then generally be quickly and easily installed on the cylinder rod 50 by threading the new wear pad 54 onto the cylinder rod 50 and tightening one or more retaining bolts 56 into the axial groove 64 of the cylinder rod 50. It should be noted that the wear pad 54 may be threaded onto the cylinder rod 50 until the one or more retaining bolts 56 are aligned with the axial groove 64 where such a groove 64 exists. A bar inserted into one or more spanner holes 70 may be used to tighten the wear pad 54 until the one or more retaining bolts 56 are aligned with the axial groove 64 in the cylinder rod 50. Ease of detachment and reattachment may further be aided by the utilization of the square thread 68 profile, which may reduce binding of the threads 68 and 69 on the wear pad 54 and cylinder rod 50.

Alternatively, one or more depressions 82 may be formed in the cylinder rod 50 and the one or more retaining bolts 56 may engage those depressions to retain the wear pad 54 on the cylinder rod 50.

An embodiment of the improved wear pad 54 of FIGS. 3 and 4 may consist of a wear member 78 having an axial wall 88 extending from a perimeter of the wear member 78. A thread 68 may be formed on the inside of the axial wall 88 of the wear member 78 to mate with a cylinder rod 50 thread 69. A plurality of threaded retaining bolt holes 80 may extend through the axial wall 88 of the wear member 78 to receive a plurality of retaining bolts 56. A plurality of spanner holes may extend into an exterior surface of the axial wall 88 of the wear pad 54. The wear pad 54 may furthermore be formed of a grade of steel that is softer than the grade of steel of the cylinder rod 50 to which the wear pad 54 is to be attached.

The improved wear pad 54 of FIGS. 3 and 4 may not include a retainer wedged against an internal stepped shoulder machined inside the cylinder rod 50. Such a retainer may disadvantageously be quick to corrode and deteriorate, permitting the wear pad 54 to become disengaged and fall off the cylinder rod 50, thus decreasing the life of the wear pad 54.

The wear pad 54 contemplated herein may also provide a benefit over a weld-on wear pad design, which generally cannot be repaired in place, but requires the substantial time required to remove the wear pad to shop conditions where the weld on the old wear pad can be removed and a replacement wear pad can be welded onto the base lift 20.

The wear pad 54 contemplated herein may have a 0.375" to 1.50" thick wear member 78 to allow for longer operation of the base lift 20 between wear pad 54 replacements than swivel wear pads and other wear pads. The thicker wear member 78 may also extend the life of the cylinder rod 50 by preventing the cylinder rod 50 from being exposed to exogenous material that the wear pad 54 is better equipped to contact.

The simple design of the wear pad 54 contemplated herein makes it easier and less expensive to make than prior wear pads. The simple fastening of the wear pad 54 contemplated herein also makes it more repairable and replaceable than prior wear pads and enables repair and replacement in place on the shield 1 in the mine. Pressure on the wear member 78 may furthermore be transmitted to the cylinder rod 50 through direct contact to minimize operational load on the threads 68 and 69 between the wear pad 54 and the cylinder rod 50.

Figure 5:
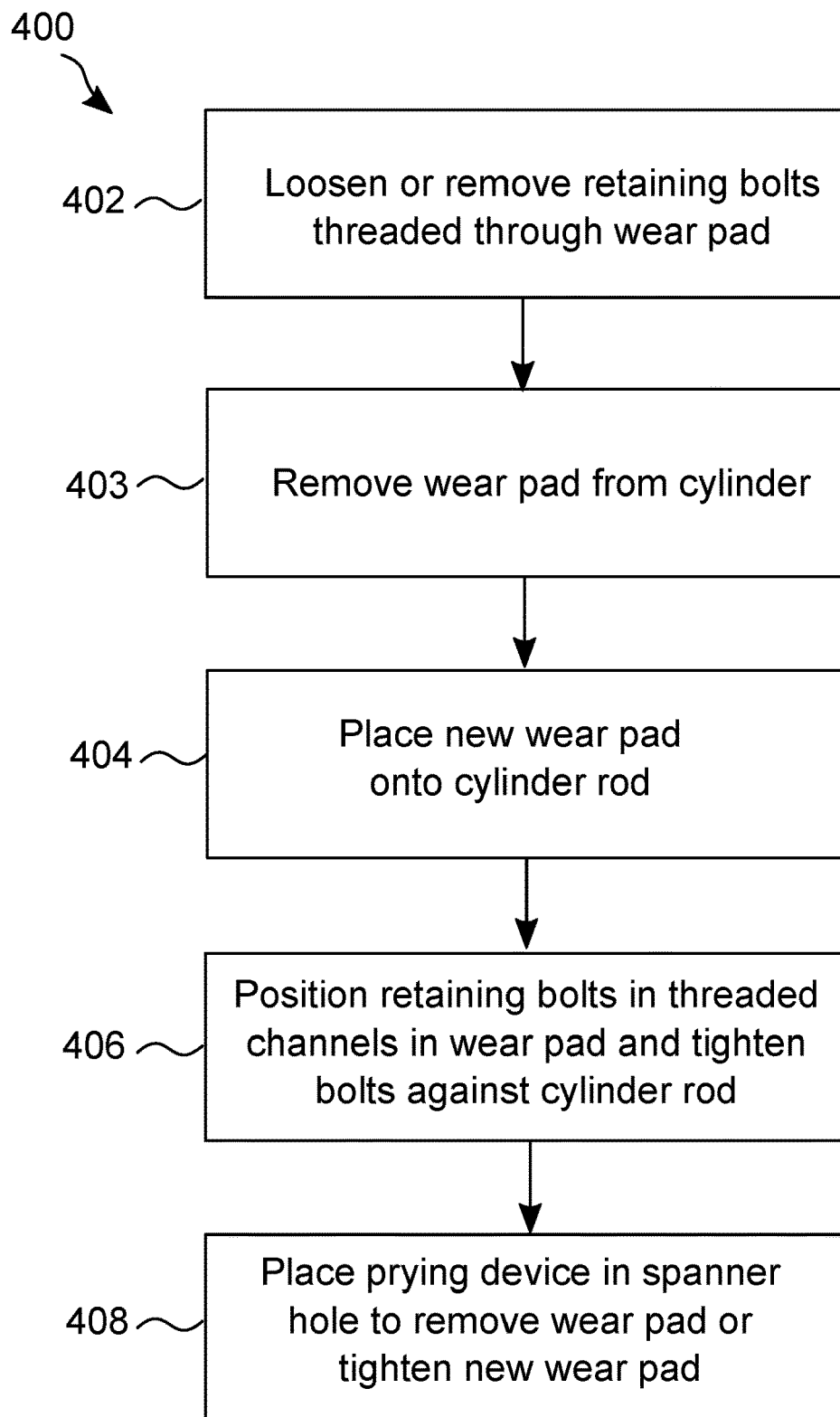
FIG. 5 illustrates a method of replacing a wear pad on a base lift.

FIG. 5 is a flow chart of a method 400 of replacing a wear pad 54 on a base lift 20. The method 400 may be used with one or more embodiments and various components illustrated in FIGS. 1-4, including the longwall mining shield 1, the advancing mechanism 16, and the base lift 20, or portions thereof. Elements of those apparatuses 1, 16, and 20 discussed in connection with those Figures will be referred to in this method 400.

The method 400 may include, at 402, loosening or removing at least one, and likely two, three or a greater plurality, of retaining bolts 56 threaded through a wear pad 20. The retaining bolts 56 may be removed or simply loosened until the retaining bolts 56 do not impinge upon the cylinder rod 50. In certain embodiments, the retaining bolts 56 must be extracted from an axial groove 64 or other depression 82 in the cylinder rod 50 so that the retaining bolts 56 do not impinge upon the cylinder rod 50 and so that the wear pad 54 can be removed from the cylinder rod 50 without interference from the retaining bolts 56. At 402, the wear pad 54 is removed from the cylinder rod by pulling the wear pad 54 from the cylinder rod or by rotating the wear pad 54 to unthread it from the cylinder rod 50 where the wear pad 54 and cylinder rod 50 are threaded together.

At 404, a new wear pad 54 is placed on the cylinder rod 50 by pressing or threading the wear pad 54 onto the cylinder rod 50. At 406, one or more of the removed or new retaining bolts 56 are positioned in one or more threaded channels 80 in the wear pad 54 and tightened against the cylinder rod 50 to retain the wear pad 54 on the cylinder rod 50 and prevent the wear pad 54 from coming off the cylinder rod 50 until the wear pad 54 is to be removed. One or more ends 74 of the one or more retaining bolts 56 may be placed in an axial groove 64 or other depression 82 formed in the cylinder rod 50 for improved retention of the wear pad 54 on the cylinder rod 50.

At 408, the wear pad 54 includes one or more and, in the present embodiment, four spanner holes 70 spaced equidistant from one another around the axial wall 88 of the wear pad 54 and extending toward the axial center of the wear pad

54. A bar or other prying device may be placed in any one of the spanner holes 70, or multiple bar-like objects may be placed in more than one spanner hole 70 and used to rotate the wear pad 54 to either assist in removing the wear pad 54 or to tighten a new wear pad 54. For example, in an embodiment in which a worn-out wear pad 54 is already threaded onto the cylinder rod 50 and the wear pad 54 cannot be removed by hand, a prybar may be inserted in a spanner hole 70 and used as a lever to rotate the wear pad 54 counter clockwise to remove the wear pad 54 from the cylinder rod 50. In another embodiment in which a new wear pad 54 is being threaded onto the cylinder rod 50 and it is desired to tighten the wear pad 54 onto the cylinder rod 50, for example to align one or more retainer bolts 56 with a groove 64 in the cylinder rod 50, a prybar may be inserted into a spanner hole 70 and used to apply leverage to tighten the wear pad 54 onto the cylinder rod 50.

While specific embodiments of the invention have been described in detail, it should be appreciated by those skilled in the art that various modifications and alternations and applications could be developed in light of the overall teachings of the disclosure. Accordingly, the particular arrangements, apparatuses, and methods disclosed are meant to be illustrative only and not limiting as to the scope of the invention.

What is claimed is:

1. A method of replacing a wear pad on a base lift, comprising:
   loosening at least one retaining bolt threaded into an axial wall extending from and forming a part of an old wear pad threaded onto a mining shield base lift cylinder rod until that retaining bolt does not impinge upon the cylinder rod;
   placing a bar in a spanner hole extending into the old wear pad and rotating the old wear pad to break loose the threading of the old wear pad from the cylinder rod;
   removing the old wear pad from the cylinder rod;
   placing a new wear pad onto the cylinder rod; and
   tightening a retaining bolt through the new wear pad until it engages the cylinder rod.

2. The method of claim 1, further comprising tightening the retaining bolt into an axial groove in the cylinder rod.

3. The method of claim 1, further comprising using the bar to unthread the old wear pad from the cylinder rod.

4. The method of claim 3, wherein the spanner hole extends axially into the old wear pad.

5. The method of claim 4, wherein the spanner hole extends through the axial wall extending from the old wear pad.

6. The method of claim 1, further comprising placing a bar in a spanner hole in the new wear pad and using the bar to thread the new wear pad onto the cylinder rod.

7. The method of claim 6, wherein the spanner hole extends axially into the new wear pad.

8. The method of claim 7, wherein the spanner hole extends through an axial wall extending from the new wear pad.

9. The method of claim 1, further comprising tightening the retaining bolt into a hole in the cylinder rod.

10. The method of claim 1, wherein removing the old wear pad from the cylinder rod includes unthreading the old wear pad from the cylinder rod.

11. The method of claim 1, wherein placing a new wear pad onto the cylinder rod includes threading the new wear pad onto the cylinder rod.

12. A method of replacing a wear pad on a base lift, comprising:
    unthreading an old wear pad from a mining shield base lift cylinder rod using a bar placed into a spanner hole extending into the old wear pad to break loose the threading;
    removing the old wear pad from the cylinder rod;
    removing a gland compressed between the wear pad and the cylinder rod;
    placing a new gland on the cylinder rod; and
    threading a new wear pad onto the cylinder rod.

13. The method of claim 12, wherein the bar is placed through a first spanner hole in an axial wall extending from the old wear pad and the bar is also placed into a second spanner hole extending through the axial wall.

14. The method of claim 12, wherein the bar is placed through a second spanner hole.

15. The method of claim 12, further comprising loosening a retaining bolt from the old wear pad until it does not engage the cylinder rod.

16. The method of claim 12, further comprising tightening a retaining bolt through the new wear pad until it engages the cylinder rod.

17. A method of removing an old wear pad from a base lift cylinder and installing a new wear pad on the base lift cylinder, comprising:
    loosening at least one retaining bolt threaded into an old wear pad on a mining shield base lift until that retaining bolt does not impinge upon a cylinder rod;
    placing a bar in a spanner hole that extends into the old wear pad;
    rotating the wear pad using the bar until the old wear pad is loose on the cylinder rod;
    removing the old wear pad from the cylinder rod;
    placing a new wear pad onto the cylinder rod; and
    tightening a retaining bolt through the new wear pad until it engages the cylinder rod.

18. The method of claim 17, wherein the bar is placed through a first spanner hole in an axial wall extending from the old wear pad and the bar is also placed into a second spanner hole extending through the axial wall.

19. The method of claim 17, further comprising tightening the retaining bolt into an axial groove in the cylinder rod.

* * * * *